Figure 2:
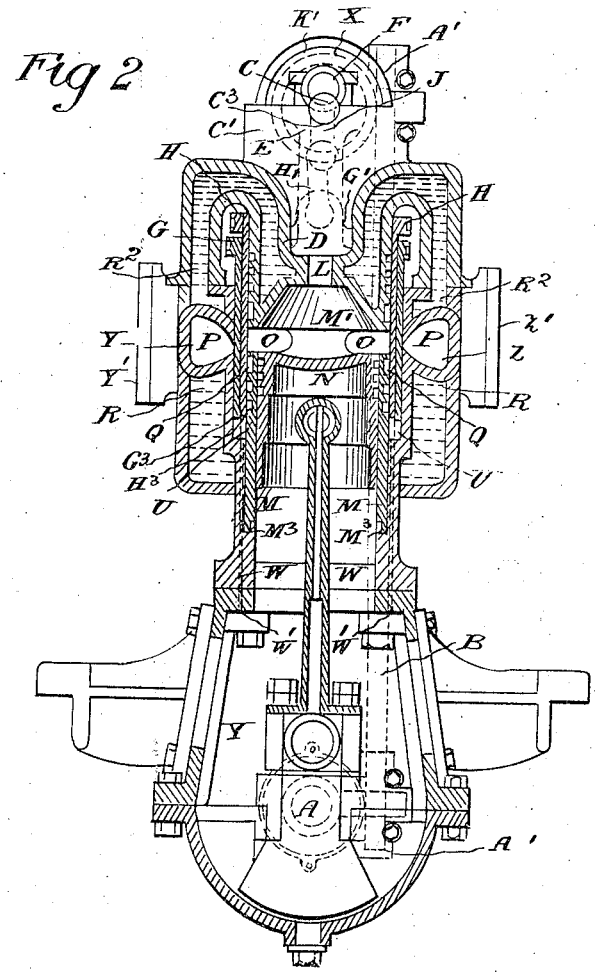

J. C. McINTOSH.
VALVE AND VALVE GEAR OF INTERNAL COMBUSTION ENGINES.
APPLICATION FILED DEC. 20, 1909.
1,211,201.
Patented Jan. 2, 1917.
7 SHEETS—SHEET 1.
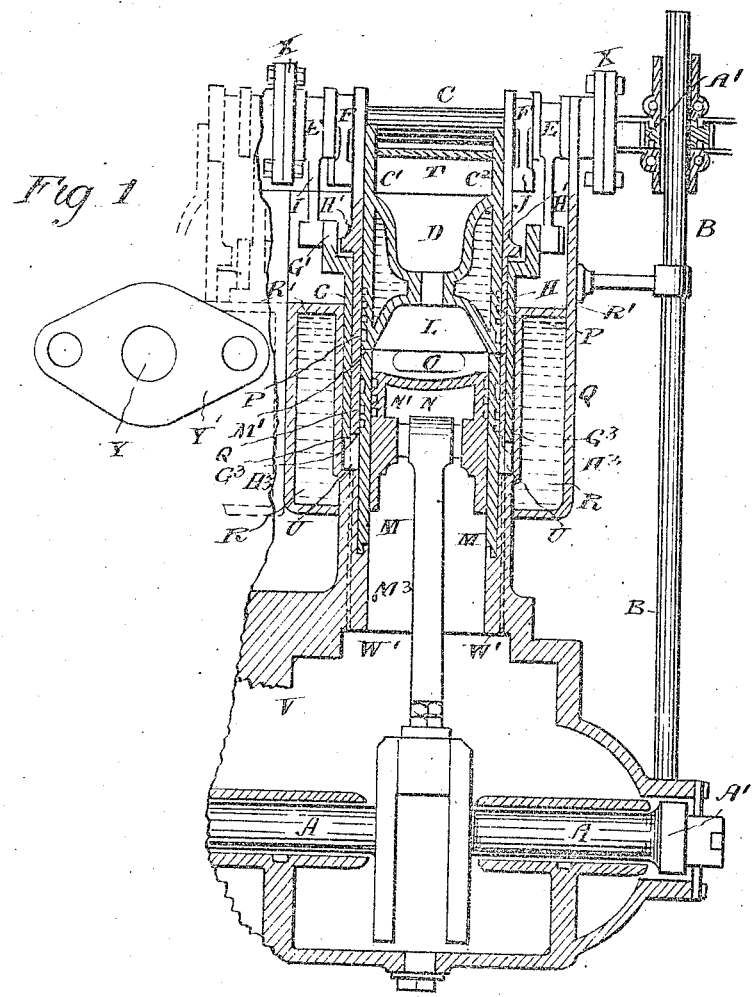
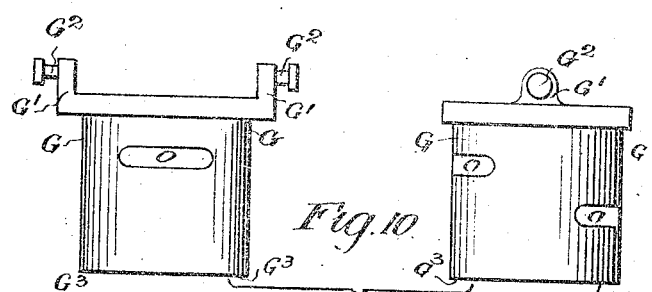
Witnesses
C. Hymann
E. Schallinger
Inventor:
John Campbell McIntosh
by B. Singer
atty J. C. McINTOSH.
VALVE AND VALVE GEAR OF INTERNAL COMBUSTION ENGINES.
APPLICATION FILED DEC. 20, 1909.

1,211,201.

Patented Jan. 2, 1917.
7 SHEETS—SHEET 2.

Witnesses
C. Hymann
E. Schalinger

Inventor
John Campbell McIntosh
by B. Singer
Atty

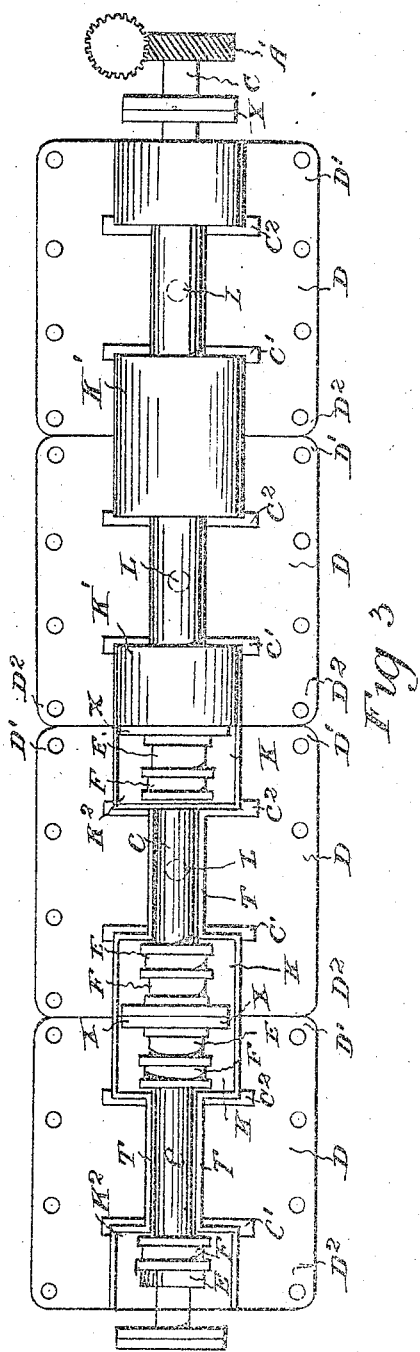
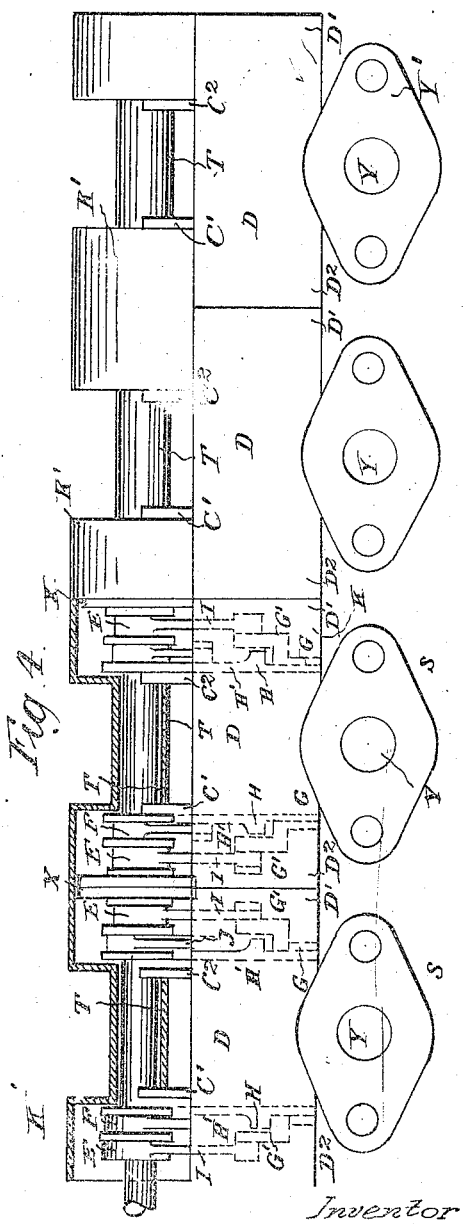

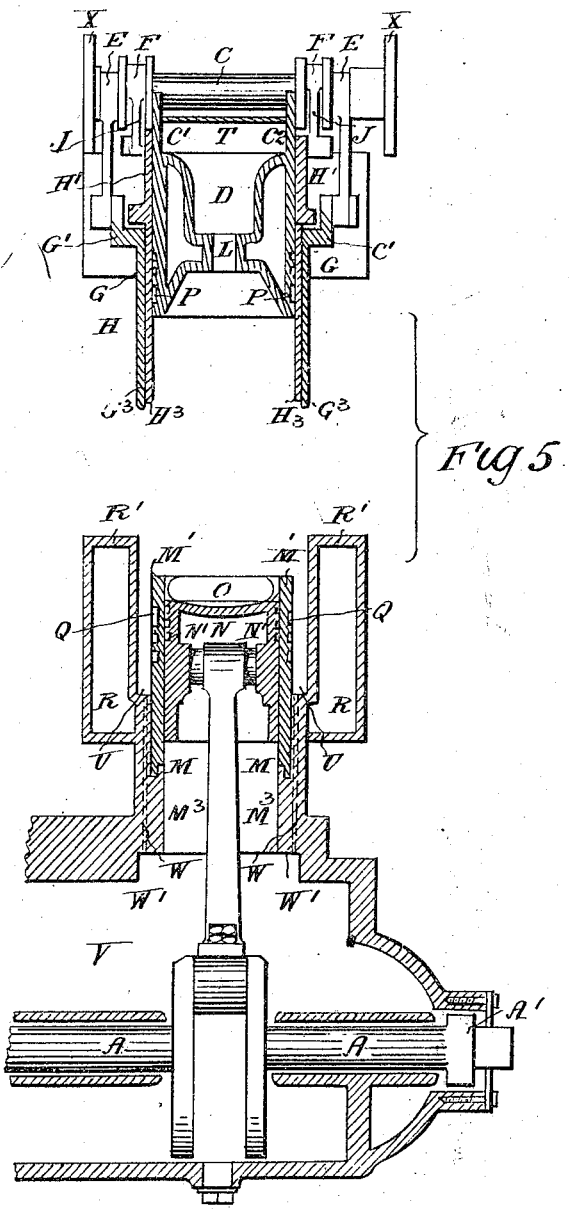

J. C. McINTOSH.
VALVE AND VALVE GEAR OF INTERNAL COMBUSTION ENGINES.
APPLICATION FILED DEC. 20, 1909.
1,211,201.
Patented Jan. 2, 1917.
7 SHEETS—SHEET 5.
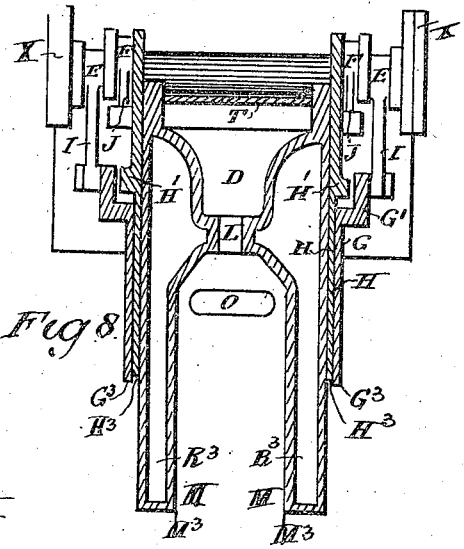
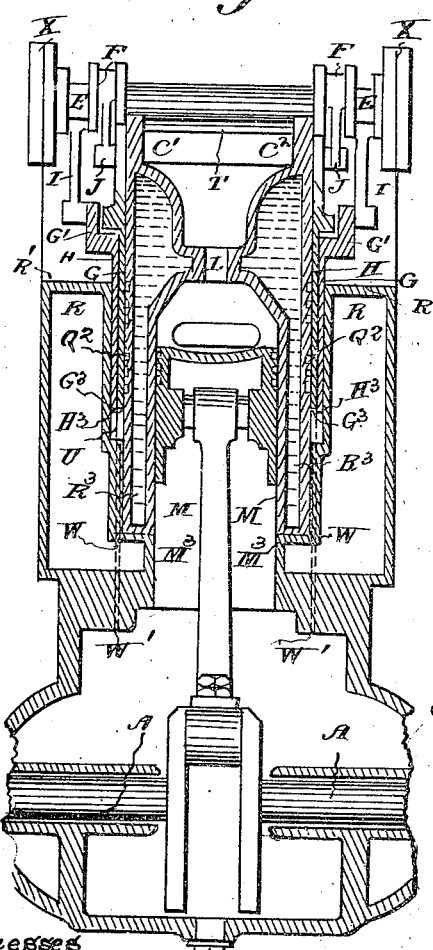
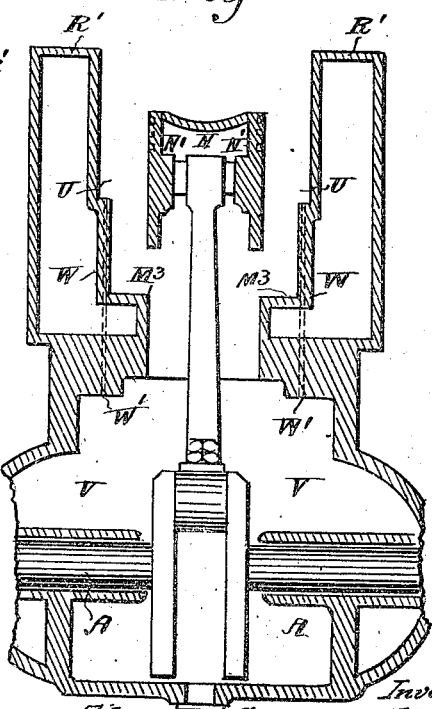

J. C. McINTOSH.
VALVE AND VALVE GEAR OF INTERNAL COMBUSTION ENGINES.
APPLICATION FILED DEC. 20, 1909.

1,211,201.

Patented Jan. 2, 1917.
7 SHEETS—SHEET 6.

Witnesses
C. Hymann
E. Schollinger

Inventor
John Campbell McIntosh
By B. Singer
Atty

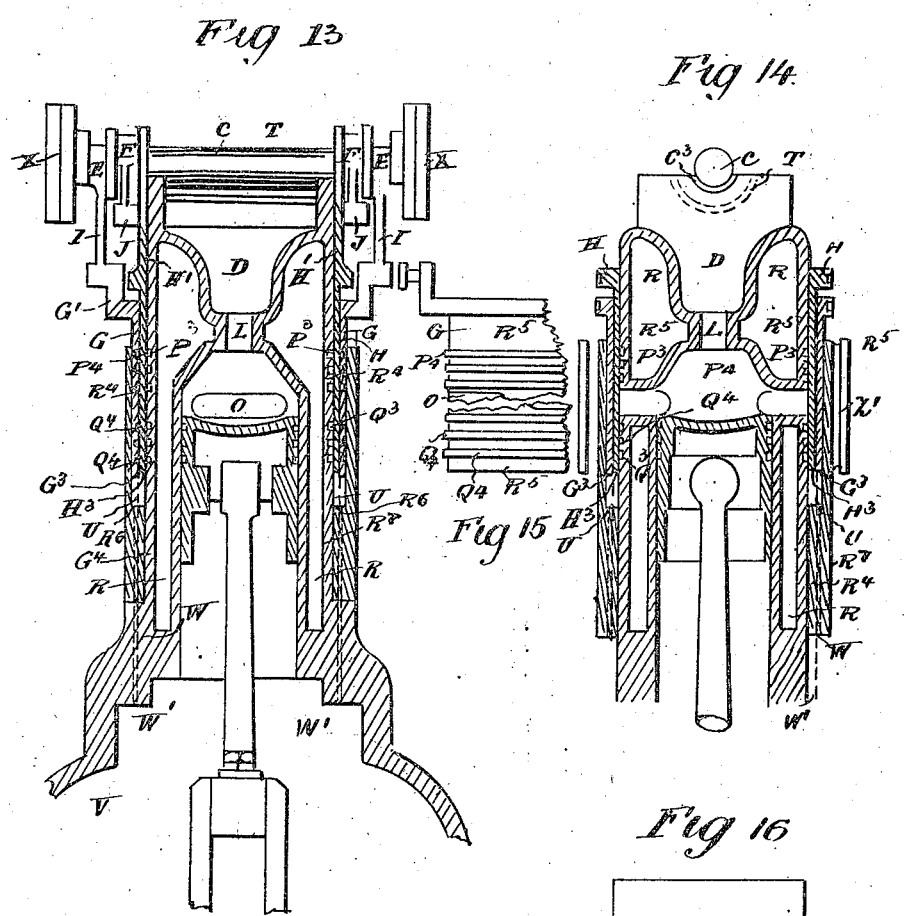

BEST AVAILABLE COPY

UNITED STATES PATENT OFFICE.

JOHN CAMPBELL McINTOSH, OF THE GLEN, BY PAISLEY, SCOTLAND, ASSIGNOR TO WILLIAM HENRY ALEXANDER AND JOHN LIDDLE, BOTH OF GLASGOW, SCOTLAND.

VALVE AND VALVE-GEAR OF INTERNAL-COMBUSTION ENGINES.

1,211,201.  Specification of Letters Patent.  Patented Jan. 2, 1917.

Application filed December 20, 1909.   Serial No. 534,168.

*To all whom it may concern:*

Be it known that I, JOHN CAMPBELL MCINTOSH, of Glenhall, The Glen, by Paisley, Scotland, have invented certain new and useful Improvements in the Valves and Valve-Gear of Internal-Combustion Engines, of which the following is a specification.

This invention which relates to improvements in and connected with internal combustion engines, has for its object to simplify the construction of such and to obtain better results, and consists of an improved device for operating the cylindrical sleeves or liners which carry valve openings or ports thereon, from two diametrically opposed points from one shaft: a means whereby the said valve sleeves may be easily removed for examination through, from, or with the cylinder head: and also a means whereby such cylindrical valve sleeves may be used without the necessity of their coming into contact with the piston.

According to my invention, the power is transmitted from the main shaft through bevel, skew, or other suitable gearing, or in any other convenient manner, and a vertical spindle to an overhead shaft placed along the center of the cylinder head or heads. This shaft carries cranks, eccentrics, or the like, and is connected to the sleeves by means of connecting rods, through suitable openings in the cylinder head or heads, bearings being also provided for the shaft. The cylinder head carries upon its lower portion from above, or below the valve ports an extension which is in the form of a liner within the cylinder and upon which liner the piston travels. This liner may be separated from the cylinder head and of any suitable length, and carries upon it on the side removed from the piston, compression rings which are in contact with the inner valve sleeve. At the lower end of the sleeves a sufficient space is left between the liner and the wall of the water jacket to admit of the movement of the sleeves and also to constitute an oil well for lubricating purposes.

In order to get ready access to the working parts of the engine, I break the connection of the eccentric or secondary crank shaft over each cylinder and by simply undoing the cylinder head attachment, the portion of the shaft at the combustion end together with the cylinder head carrying the bearings therefor and also the connecting rods and valve sleeves may be easily removed.

In producing the improvements the object aimed at by me has been to produce a four stroke cycle motor, on the slide valve principle, more positive and flexible in action than hitherto, and also to create an engine as free from noise, and complications as possible, while at the same time possessing an exceptionally wide range of speed and power.

In order that my invention may be properly understood and readily carried into effect, I have hereunto appended seven sheets of drawings, of which—

Figure 9:
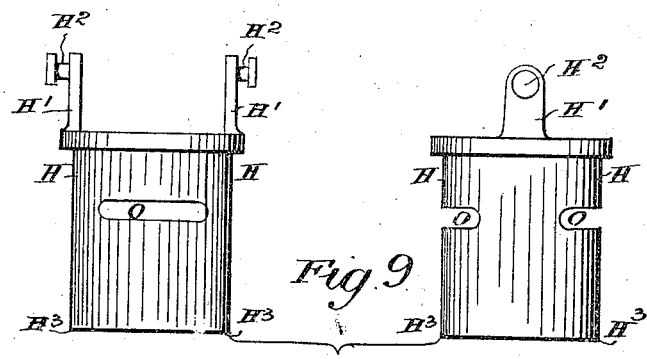
Figure 11:
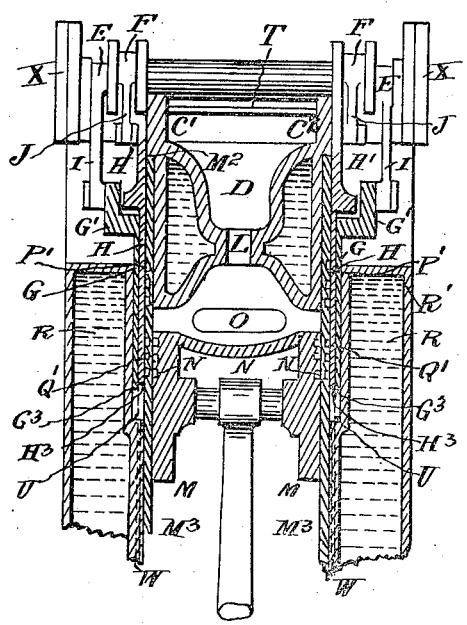
Figure 12:
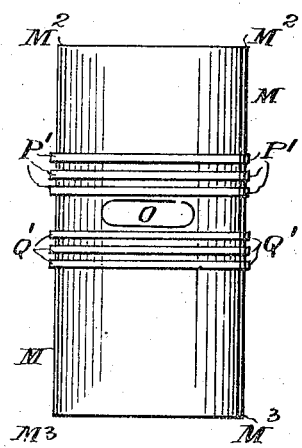

Figure 1 is a sectional longitudinal elevation of a slide valve motor embodying my invention. Fig. 2 is a sectional elevation of the same. Fig. 3 is a plan, and Fig. 4 is an elevation partly sectional respectively of the motor having four cylinder heads. Fig. 5 is a sectional elevation showing cylinder head removed for inspection and the cylinder liner separate from the cylinder head and removed therefrom. Fig. 6 is a sectional elevation of a motor with the cylinder liner water cooled and attached to the cylinder head. Fig. 7 is a sectional elevation with cylinder head sleeves and water cooled liner removed. Fig. 8 is a sectional elevation of the cylinder head sleeves and water cooled liner removed from the water jacket. Fig. 9 is a longitudinal elevation and end view respectively of the inner valve sleeves. Fig. 10 is a longitudinal elevation and end view respectively of the outer valve sleeve. Fig. 11 is a sectional elevation of a motor corresponding to Fig. 1 but showing detachable liner in position carrying compression rings above and below the valve ports. Fig. 12 is an elevation of the liner detached. Fig. 13 is a sectional elevation of a motor carrying the valve sleeves on the outer side of water jacket. Fig. 14 is a similar view taken at right angles to that of Fig. 12. Fig. 15 is an elevation of the outer sleeve showing compression rings on its exterior walls. Fig. 16 is an elevation of the detachable liner with a slightly different method of fitting the compression rings, all hereafter more fully referred to and described.

As will be observed from the drawings, power is transmitted from the main shaft A, through inclosed skew or other suitable gearing $A^1$ and a vertical spindle B to a lay or secondary shaft C situated along the center of the cylinder heads D. The arrangement of the cranks E, F, and valve ports O upon the sleeves G, H, and the movements of the sleeves G, H, for the opening and closing of the valve ports O, as shown in the drawings, may be similar to what is now the practice in certain types, or the cranks E, F, and arrangement of the valve ports O and the movements of the sleeves G, H, for the opening and closing of the valve ports O may be a reversal of the practice in said types. The lay or secondary shaft C which may by a suitable arrangement of the skew $A^1$ or other gearing, be made to run at the same speed as the main shaft A, or at a faster or slower speed to suit the arrangement of the opening and closing of the valve ports upon the sleeves G, H, and the arrangement of the cranks or eccentrics E, F,—may be made in one piece, or preferably as is shown in the drawings, built up so that each cylinder head D carries its own separate portion thereof for removal therewith, flange X or other suitable couplings being provided upon the lay shaft C at or near the ends of each cylinder to allow of its disconnection—carries upon it at a position above each end of each cylinder a pair of cranks E, F, or eccentrics from which power is transmitted to the valve sleeves G, H, through small connecting rods I, J. It will be noticed that each valve sleeve G, H, carries upon its upper end small extension pieces $G^1$ $H^1$ which may be of any suitable size or shape which allows them to be connected to the valve connecting rods I, J; and have upon them bearings $G^2$ $H^2$, Figs. 9 and 10, or connections at or near the top thereof and engaging with the lower ends of the valve connecting rods I, J, to which they are connected in any suitable manner.

To accommodate the valve extension pieces $G^1$ $H^1$ and valve connecting rods I, J, it will be seen that two small rectangular or other suitable shaped apertures K are taken out of the ends of each cylinder head D to provide for the operation of the valves. The height of these apertures K is of course the height of the cylinder head D, the water jacket R of the cylinder being carried across solid $R^1$ where that portion of the cylinder head D coincides with the cylinder while at other portions it may be left partly open $R^2$ to act as water communicating ports between the cylinder head D and the main water jacket R of the cylinder. It will be seen that in the case of a multi-cylinder engine, Figs. 3 and 4, where the cylinders are cast together as a single casting that as the two ends $D^1$ $D^2$ of two cylinder heads D come together, the apertures K on the ends of each coincide and thus form, as it were, a single rectangular or other suitable shaped box between two cylinder heads D, into which the connecting rods I, J, of the valves of two different cylinders S, $S^1$, Figs. 3 and 4, dip. The aperture K thus formed, it will be noticed may accordingly be utilized for lubrication purposes, as a grease cup or oil well, as the aperture K and valve mechanism C, E, F, $G^1$, $H^1$, $G^2$, $H^2$, I, J, are inclosed in a detachable cover $K^1$ casing. When each cylinder S, $S^1$ is a separate casting the apertures may of course remain separate. The bearings $C^3$ for the lay or secondary or eccentric shaft C are provided upon two supports $C^2$ $C^1$ springing from the cylinder head D at or near the ends $K^2$, Fig. 3, of the aperture K. A semi-circular bridging piece T stretches from one support $C^1$ to the other $C^2$ along and above the cylinder head D, giving strength to the supports $C^1$ $C^2$ and bearings $C^3$, forms the lower half of that portion of the lay shaft casing $K^1$ and at the same time an oil well which may be used for lubrication of the bearings $C^3$ and connecting rod bearings E, E, $G^1$, $H^1$.

The center of the cylinder head D, as seen in Figs. 1, 2, 3, 5, 6, 8, 11, 13 and 14 forms a depression in the middle of which provision is shown for the sparking plug L under the lay shaft C, the depression on the cylinder head of even very small powers being sufficient to allow of its introduction and accommodation. It will be observed from the drawings that a liner M intervenes between the piston N and the valve sleeves G, H, and forms the surface upon which the piston N travels, thus taking the place of an orthodox cylinder and having the valve sleeves G, H, externally to it, this for several reasons being a much better arrangement in practice than allowing the valve sleeves G, H, to drop down into a cylinder in contact with the piston.

The valve sleeves G, H, shown on the drawings will be seen to be remarkably small and light, and while in the positions shown being free from the disadvantage due to the friction of the sleeves G, H, with and against the piston N, where the two are in contact, they have also the enormous advantage that in the event of a breakage occurring, the broken portion will merely drop to the bottom of the small annular space U provided for their movement at their lower end, between the liner and the wall of the water jacket, or between the water jacket and the inclosing outer sleeve cover, as in Figs. 13 and 14, where it may remain harmless until removed. It will also be noticed that the friction of the sleeves themselves has been considerably reduced owing to their shortness. The length of the valve sleeves G, H, need be no greater than shown in the drawings, which indicate their lower ends $G^3$ $H^3$ at or near the upmost point of travel a little below the lowest compression ring Q on the liner.

The liner M, in Figs. 1 and 2, is shown in detached form, its engagement $M^1$ with the cylinder head D being just above the valve ports O. It will be observed that compression rings are fitted above and below the valve ports O, the upper rings P being fitted upon the cylinder head D, the lower ones Q upon the liner. An alternative method of constructing the detachable liner M is shown in Figs. 11 and 12, which shows it arranged to carry compression rings $P^1$ $Q^1$ both above $P^1$ and below $Q^1$ the valve ports O, its joint $M^2$ with the cylinder head D occurring above the uppermost compression ring $P^1$. The compression rings may however be arranged on the liner M or water jacket R, Figs. 13 and 14, as shown in Fig. 16, where two or broad rings $P^5$ and $Q^5$ are arranged to surround the liner M or water jacket R elliptically, passing between the valve ports O, from above the one $P^5$ to below the other $Q^5$.

In Figs. 13 and 14 the liner is shown to be integral with the cylinder head, but obviously it is possible to modify this construction so that the liner may be separated from the head or may be withdrawn with the same, and it may be also water cooled $R^3$ as shown in Figs. 6 and 8, where it takes the form of and is perhaps better designated as an inner water jacket and arranged to carry upon it on the side removed from the piston N, the compression rings $P^2$ $Q^2$ which are in contact with the inner valve sleeve H. The length of the liner M indicated in the drawings shows its joint $M^3$ with the water jacket walls, occurring just below the lowest point of travel of the lowest piston ring $N^1$, this position being determined on to obviate the piston rings riding over the joint $M^3$. A dotted line W in the center of the lower portion of the water jacket wall will be noticed on the drawings indicating a drilling from the crank chamber V to the space U allowed at the bottom of the valve sleeves G, H, for their motion. These drillings W may be used in two ways for lubrication purposes, oil being led to the lower ends $W^1$ under pressure and forced upward to the sleeves G, H, or they may be employed as relief vents to carry off any excess of oil. In place of the drillings W a pipe may be used for the same purpose.

The modified construction for operating the valve sleeves G, H, from or near two diametrically opposed points thereon from one lay or secondary shaft C without the valve sleeves G, H, coming into contact with the piston N, is shown in Figs. 13 and 14. In this form the valve sleeves G, H, are passed down the outer wall $R^4$ of the water jacket R which carries upon it on its outer wall $R^4$ at a position above $P^3$ and below $Q^3$ its valve ports O, compression rings $P^3$ $Q^3$ in contact with the inner valve sleeve H. The outer valve sleeve G, Fig. 15, is arranged to carry compression rings $P^4$ $Q^4$ upon its exterior surface $R^5$ in contact with the inner surface $R^6$ of a cylindrical covering $R^7$ for the valve sleeves G, H, and upon which provision is made for induction Y and exhaust ports Z and flanges $Y^1$ $Z^1$ for connection to the inlet and exhaust piping. In this application of the principle it is unnecessary to have the cylinder head detachable, and it will be seen that the uncoupling X of the lay shaft C allows the valve sleeves G, H, to be withdrawn from their position. The compression holding arrangements shown are amply sufficient, as owing to the two point suspension and positive lift of the valves, their construction can be brought to an accurate sliding fit. The number of compression rings above and below the valve ports may be varied in number.

On the score of accessibility alone the engine presents exceptionally strong features, as it will be seen that the uncoupling X of the lay shaft C and removal of the cylinder head fastening nuts of any cylinder, enables one to detach the cylinder head D which brings away with it its own portion of the lay shaft C together with the valves G, H, and valve mechanism I, J, $G^1$ $H^1$ $G^2$ $H^2$ a feature which has never before been possible, as shown in Figs. 5 and 8.

Claims.

1. In an engine of the class described the combination of a cylinder head, a piston movable with respect to said cylinder head, a shaft operatively connected with said piston, a secondary shaft at the combustion end, an inner and outer valve sleeve, in engagement with each other and surrounding said cylinder head, and means for actuating said sleeve from said secondary shaft.

2. In an engine of the class described the combination of a cylinder head, a piston slidable with respect to said cylinder head, a shaft operatively connected with said piston, a secondary shaft at the combustion end in driving connection with said first named shaft, valve sleeves in engagement with each other and surrounding said cylinder head, means for connecting said valve sleeves with said secondary shaft, said means engaging said sleeves on a plurality of points on the circumference thereof, and a casing for said last named shaft.

3. In an engine of the class described the combination of a cylinder head, a piston movable with respect to said cylinder head, a shaft operatively connected with said piston, a secondary shaft at the combustion end in driving relation with said first named shaft, valve sleeves in engagement with each other and surrounding said cylinder head, means for connecting said valve sleeves with said secondary shaft, said means engaging said sleeves on a plurality of points on the circumference thereof, a casing for said last named shaft, and a casing inclosing said connecting means, said casings being in communication with each other.

4. In an engine of the class described the combination of a cylinder head, a piston movable with respect to the cylinder head, a shaft operatively connected with said piston, a secondary shaft at the combustion end in driving relation with said first named shaft, valve sleeves in engagement with each other and surrounding said cylinder head extensions projecting from each of said sleeves at diametrically opposite points, the extensions of all of the sleeves being in alinement with respect to each other, elements connected with the secondary shaft and in engagement with said extensions, and a casing for said last named shaft.

5. In an engine of the class described, the combination of a cylinder head, a piston movable with respect to the cylinder head, a shaft operatively connected with the piston, a second shaft at the combustion end in driving relation with said first named shaft, valve sleeves in circumferential engagement with each other and controlled from the second shaft, a lining in the cylinder head and means for water cooling the lining, head and valve sleeves.

In testimony whereof I affix my signature in presence of two witnesses.

J. CAMPBELL McINTOSH.

Witnesses:
 JOHN LIDDLE,
 JOHN TRAIN LIDDLE.